United States Patent
Vannorsdel et al.

(10) Patent No.: US 6,170,922 B1
(45) Date of Patent: Jan. 9, 2001

(54) PRESSURIZED GAS TO RELEASE SPRING APPLIED HYDRAULICALLY RELEASED BRAKES

(75) Inventors: Randy Scott Vannorsdel; Henry Richard Fjellman, both of Dubuque, IA (US)

(73) Assignee: Deere & Company, Moline, IL (US)

( * ) Notice: Under 35 U.S.C. 154(b), the term of this patent shall be extended for 0 days.

(21) Appl. No.: 09/313,853

(22) Filed: May 18, 1999

(51) Int. Cl.$^7$ .................................................. B60T 13/22
(52) U.S. Cl. .................................. 303/71; 303/3; 60/404
(58) Field of Search ............................. 188/352; 303/85, 303/71; 73/121; 60/403, 404, 405

(56) References Cited

U.S. PATENT DOCUMENTS

| | | | |
|---|---|---|---|
| 3,854,559 | 12/1974 | Talak et al. | 192/4 A |
| 3,958,454 | * 5/1976 | Rasch | 73/121 |
| 4,123,906 | * 11/1978 | Durgan et al. | 60/403 |
| 4,199,355 | * 4/1980 | Kreitner | 303/85 |
| 4,451,095 | * 5/1984 | Chichester et al. | 303/71 |
| 4,576,418 | * 3/1986 | Holzinger et al. | 303/71 |
| 4,662,412 | * 5/1987 | Swallert | 141/284 |
| 5,203,616 | 4/1993 | Johnson | 303/10 |
| 5,357,800 | * 10/1994 | Reuter et al. | 73/121 |
| 5,984,425 | * 11/1999 | Orzal | 303/3 |

* cited by examiner

Primary Examiner—Robert Oberleiter
Assistant Examiner—Ben Pezzlo

(57) ABSTRACT

A simple hand held carbon dioxide applicator having a pressurized carbon dioxide cartridge is used to release spring applied hydraulically released brakes. The hydraulic line extending between the hydraulic pump and the brake control valve is provided with a first coupler of a quick coupling with the corresponding second coupler being hydraulically positioned between the hydraulic line and the pump. An auxiliary line is provided having an auxiliary coupler identical to the second coupler so that the auxiliary line can be attached to the first coupler. The auxiliary line is also provided with a gas check valve in the form of a schraeder valve to which the hand held carbon dioxide applicator is pneumatically coupled.

10 Claims, 2 Drawing Sheets

PRESSURIZED GAS TO RELEASE SPRING APPLIED HYDRAULICALLY RELEASED BRAKES

BACKGROUND OF THE INVENTION

1. Field of the Invention

The invention is directed to a method and apparatus for releasing spring applied hydraulically released brakes when the source of pressurized hydraulic fluid fails.

2. Description of the Prior Art

Large work vehicles are increasingly using spring applied hydraulically released brakes. These brakes are always applied unless released by hydraulic pressure. Typically these brakes cannot be released unless the engine is running and the source of pressurized hydraulic fluid, a pump, is directing hydraulic fluid to the brakes. Sometimes the engines or the hydraulic pumps on these machines break down in remote locations where it is inconvenient to repair. This is especially true in forest fire applications where moving the vehicle is time critical. The repair person may need to tow the vehicle to a more suitable location to perform repairs. However as the brakes are in an applied mode it makes towing the vehicle difficult if not impossible. Therefore an external source of hydraulic pressure needs to be applied to the brakes to release the brakes before towing the vehicle.

Pressurized carbon dioxide cartridges are used in a number of applications. Simple hand held applicators are used to apply pressurized carbon dioxide gas to inflating tires, inflating air bladders on athletic shoes and skates and other applications. These hand held applicators may have variable flow valves to control the application of carbon dioxide gas.

SUMMARY OF THE INVENTION

It is an object of the present invention to provide a simple method and apparatus for releasing spring applied hydraulically released brakes when the vehicle's engine or the hydraulic pumps are inoperative.

It is a feature of this invention that a simple hand held mechanism for applying pressurized carbon dioxide or other compatible gases is used to release the brakes.

Spring applied hydraulically released brakes are always applied and are released by the application of hydraulic pressure. Typically a source of hydraulic pressure, a hydraulic pump, is coupled by a hydraulic line to the spring applied hydraulically released brakes. An intervening valve controlled by the brake foot pedals is hydraulically positioned between the pump and the brakes. If the foot pedal is depressed the brakes are applied by directing the pressurized hydraulic fluid from the brake chamber to tank.

In the present invention the hydraulic line is provided with a quick coupler coupling the hydraulic line to the pump. This quick coupler has a first coupling on the hydraulic line and a second coupling located between the first coupling and the pump. An auxiliary line is provided with an auxiliary coupler. This line is provided with a gas check valve which maybe in the form of a schraeder valve used on tires. If the engine or pump fails to operate, the operator can decouple the quick coupler and apply the first coupling to the auxiliary line coupler. The auxiliary line coupler and the second coupler are identical. A hand held carbon dioxide applicator of the type used to inflate tires and athletic shoes can then be attached to the schraeder valve and gas pressure can be applied through the auxiliary line to the hydraulic line where it pressurizes the hydraulic fluid and releases the brakes.

DESCRIPTION OF THE PREFERRED EMBODIMENT

Figure 1:
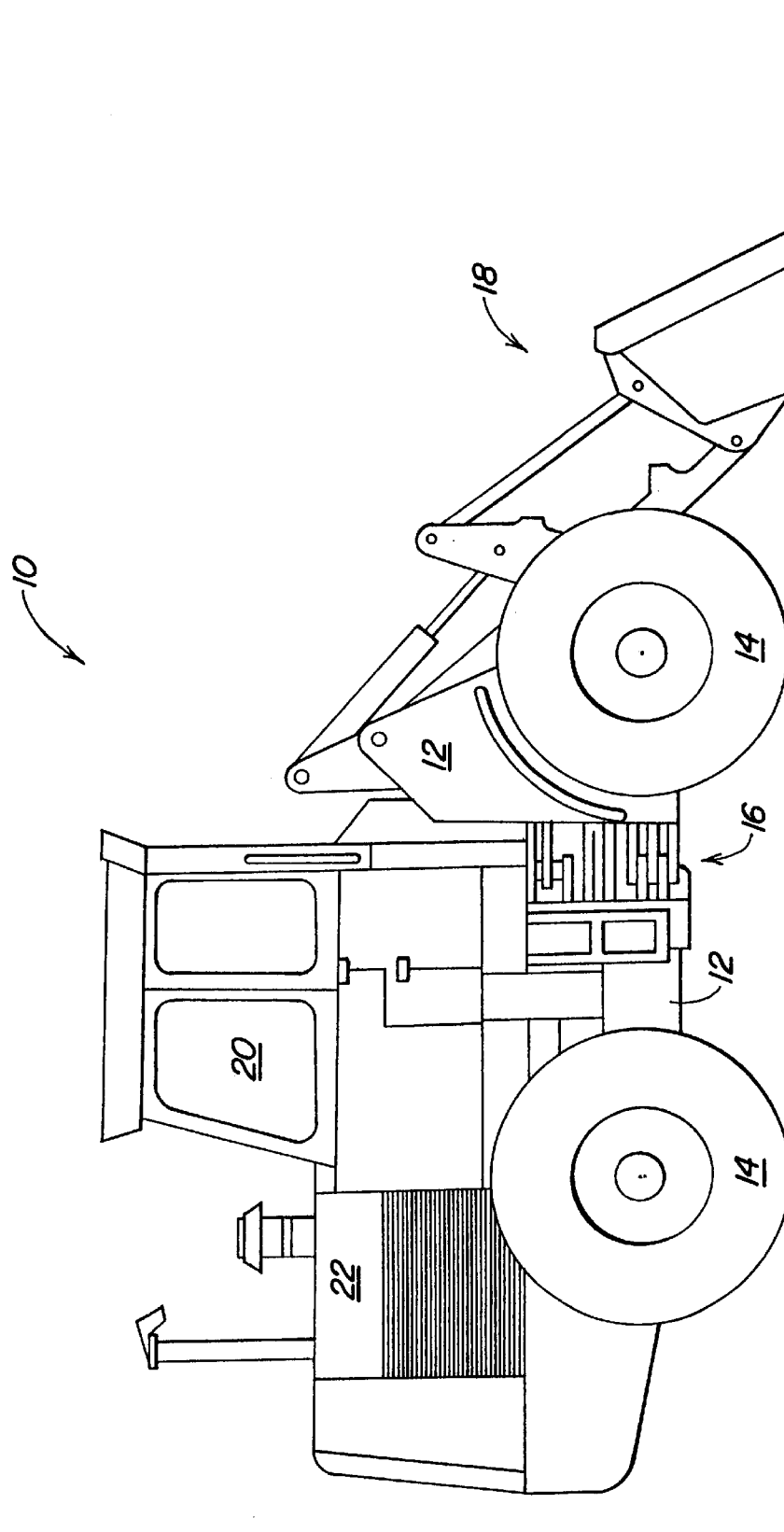
FIG. 1 is a side view of a work vehicle.
Figure 2:
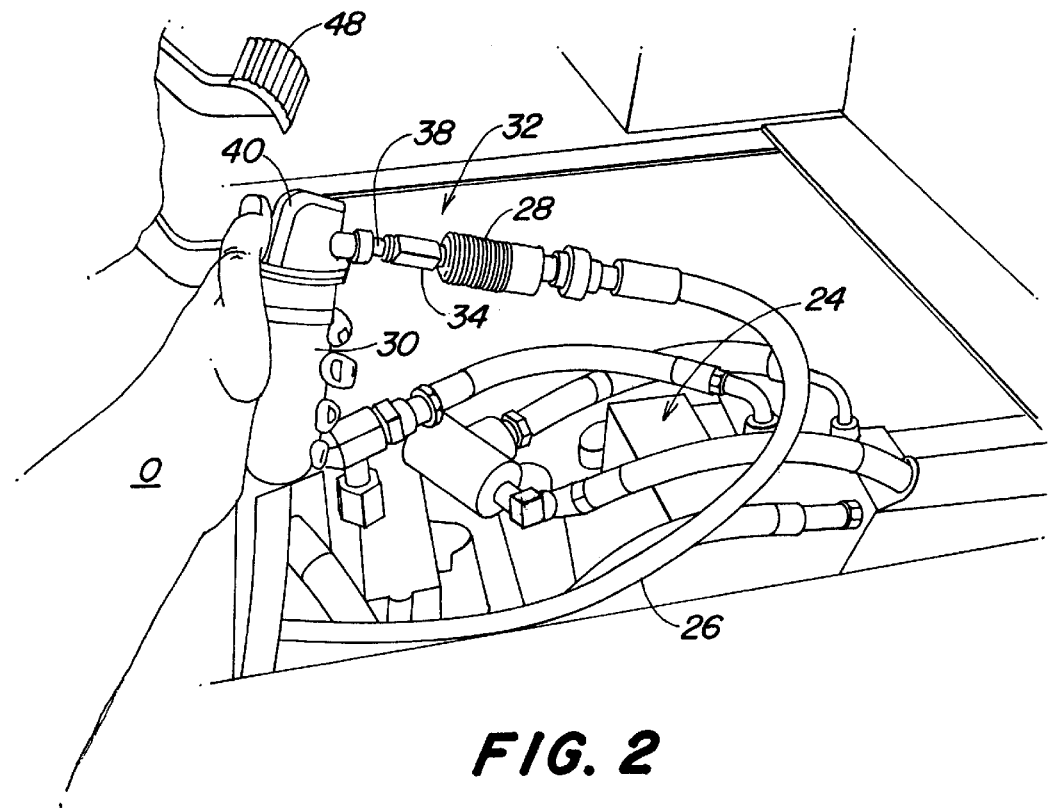
FIG. 2 is a perspective view of a carbon dioxide applicator being coupled to the brake hydraulic system.

FIG. 1 illustrates a four wheel drive work vehicle 10 having a frame 12 which is supported on ground engaging wheels 14. The frame is articulated about pivot 16. The front of the vehicle 10 is provided with a work implement 18 in the form of a bucket with suitable control linkage. The vehicle is controlled by an operator in operator's cab 20. The vehicle is powered by an internal combustion engine located in engine compartment 22. The engine also drives a hydraulic pump 24 for operating the work implement and other vehicle functions, as shown in FIG. 2. It should be noted that the work vehicle is illustrated as being a four wheel drive loader, however this invention could be applied to other work vehicles having spring applied hydraulic released brakes, like forestry skidders, graders, loader backhoes, feller bunchers, scrapers, farm tractors, cotton harvester and combines and other work vehicles. In addition, although the work vehicle is illustrated as being a wheeled vehicle, this invention could also be used on tracked vehicles where the ground engaging means are tracks or belts, such as bulldozers, excavators, farm tractors and others.

Figure 3:
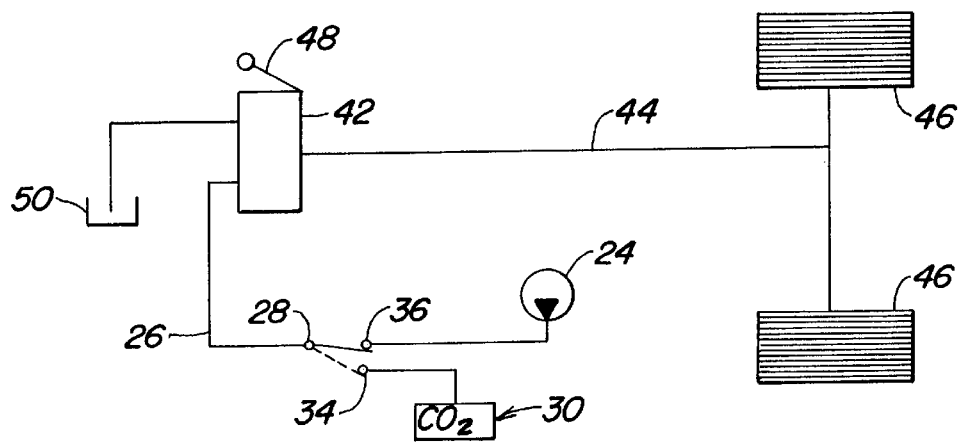
FIG. 3 is a hydraulic schematic of the system.

FIG. 2 is a perspective view of the floor of the operator's cab 20 wherein an access panel has been removed to reveal the hydraulic pump 24. In this figure, hydraulic line 26 has been detached from the pump 24. The hydraulic line 26 is provided with a first coupler 28 of the quick coupler. A carbon dioxide applicator 30 having a conventional carbon dioxide cartridge is attached to auxiliary line 32 which is provided with an auxiliary coupler 34 which is attached to the first coupler 28 by an operator O. The auxiliary coupler 34 being identical to the second coupler 36 of the quick coupler, as indicated in FIG. 3. The auxiliary line 32 is also provided with a gas check valve 38. In the present embodiment the gas check valve 38 is a schraeder valve of the type used on tires. By depressing the thumb lever 40 on the gas applicator 30 pressurized carbon dioxide is directed through the auxiliary line into the hydraulic line 26. This pressurized gas drives hydraulic fluid through the brake control valve 42 through a second hydraulic line 44 pressurizing the spring applied hydraulically released brakes 46 and releasing the brakes 46.

The brake control valve 42 is of the type used on spring applied hydraulically released brakes in that it is normally open and only closed when brake pedal 48 is depressed. Upon depressing brake pedal 48, the pressurized hydraulic fluid from the brake chamber 46 is directed to tank 50 reducing hydraulic pressure in the second hydraulic line 44. Reducing hydraulic pressure in second hydraulic line 44 reduces pressure in the spring applied hydraulically released brake packs 46 so that the spring in the brake packs overcomes the reduced hydraulic pressure and the brakes are applied.

The above described invention is described as being used with conventional carbon dioxide cartridges. These cartridges work well because they are readily available, however other compatible gases, like nitrogen, could be used. An important consideration in selecting which gas to use is finding a gas that will not react with the hydraulic fluid or the seals used in the hydraulic system.

The invention should not be limited by the above-described embodiments, but should be limited solely by the claims that follow.

What is claimed is:

1. A method of releasing spring applied hydraulically released brakes when pressurized hydraulic fluid is not available, the method comprising the following steps:

attaching a source of pressurized gas to a gas check valve being mounted to a hydraulic line that is coupled to the spring applied hydraulically released brakes;

injecting pressurized gas into the hydraulic line through the check valve for releasing the brakes.

2. A method as defined by claim 1 comprising the additional step of attaching the gas check valve to the hydraulic line.

3. A method as defined by claim 2 wherein the source of pressurized gas is a hand held pressure source having a pressurized gas cartridge.

4. A method as defined by claim 3 wherein the pressurized gas cartridge is a conventional carbon dioxide cartridge.

5. A method as defined by claim 4 comprising the additional step of removing the hand held pressure source from the gas check valve.

6. A method as defined by claim 5 wherein the hydraulic line is provided with a quick coupler for easily attaching the gas check valve to the hydraulic line.

7. A work vehicle for performing a work operation, the vehicle comprising:

a frame;

ground engaging means for supporting and propelling the vehicle across a surface;

a source of pressurized hydraulic fluid;

a spring applied hydraulically released brake for braking the vehicle, the brake being released by the application of hydraulic pressure to the brake;

a hydraulic line extending between the source of pressurized hydraulic fluid and the spring applied hydraulically released brake;

a first coupler being attached between the hydraulic line and the source of pressurized hydraulic fluid;

an auxiliary conduit having an auxiliary coupler that mates with the first coupler, the auxiliary conduit also being provided with a gas check valve;

a source of pressurized gas adapted to be coupled to the auxiliary conduit;

whereby if the source of pressurized hydraulic fluid fails the auxiliary conduit is attached to the first coupling and the source of pressurized gas is attached to the auxiliary conduit for supplying pressurized gas to the hydraulic line and releasing the brakes.

8. A work vehicle as defined by claim 7 wherein the source of pressurized gas is a hand held pressure source having a pressurized gas cartridge.

9. A work vehicle as defined by claim 8 wherein the pressurized gas cartridge is a conventional carbon dioxide cartridge.

10. A work vehicle as defined by claim 9 wherein the first coupler is a quick coupler and the auxiliary coupler is a corresponding quick coupler.

* * * * *